United States Patent
Chhabra et al.

(10) Patent No.: US 9,501,126 B1
(45) Date of Patent: *Nov. 22, 2016

(54) POWER MANAGEMENT IN A WIRELESS LOCAL AREA NETWORK

(71) Applicant: MARVELL INTERNATIONAL LTD., Hamilton (BM)

(72) Inventors: Kapil Chhabra, Milpitas, CA (US); Zhenyu Zhang, Mountainview, CA (US)

(73) Assignee: Marvell International Ltd., Hamilton (BM)

(*) Notice: Subject to any disclaimer, the term of this patent is extended or adjusted under 35 U.S.C. 154(b) by 20 days.

This patent is subject to a terminal disclaimer.

(21) Appl. No.: 14/286,704

(22) Filed: May 23, 2014

Related U.S. Application Data (63) Continuation of application No. 13/908,302, filed on Jun. 3, 2013, now Pat. No. 8,738,948, which is a continuation of application No. 13/371,818, filed on Feb. 13, 2012, now Pat. No. 8,458,502, which is a continuation of application No. 12/177,656, filed on Jul. 22, 2008, now Pat. No. 8,127,159.

(60) Provisional application No. 60/951,350, filed on Jul. 23, 2007.

(51) Int. Cl.
```
G06F 1/00      (2006.01)
G06F 1/26      (2006.01)
G06F 1/32      (2006.01)
G06F 15/16     (2006.01)
H04B 7/00      (2006.01)
H04W 52/02     (2009.01)
H04W 84/12     (2009.01)
```

(52) U.S. Cl.
CPC ............ *G06F 1/3209* (2013.01); *G06F 1/3206* (2013.01); *H04W 52/0206* (2013.01); *H04W 52/0225* (2013.01); *G06F 1/32* (2013.01); *G06F 1/3203* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 5,560,021 A | 9/1996 | Vook et al. | |
| 5,625,882 A | 4/1997 | Vook et al. | |
| 6,065,073 A | 5/2000 | Booth | |
| 8,458,502 B1 * | 6/2013 | Chhabra et al. | 713/320 |
| 8,548,502 B2 | 10/2013 | Karaoguz et al. | |
| 8,738,948 B1 * | 5/2014 | Chhabra et al. | 713/320 |
| 2008/0112347 A1 | 5/2008 | Gossain et al. | |

(Continued)

OTHER PUBLICATIONS

Dan Clein, "What is Full Custom Design", Jun. 8, 2001, EE Times, available at http://www.eetimes.com/document.asp?doc_id=1277368.*

(Continued)

*Primary Examiner* — Ji H Bae (57) ABSTRACT

A computer readable storage medium or media stores machine readable instructions that, when executed by one or more processors, cause the one or more processors to, while a device in a communication network is operating in a first power management mode, simultaneously monitor for an expiration of a first period of time during which no message traffic is observed at all on a communication channel of the communication network, and an expiration of a second period of time during which no message traffic destined for the device is received by the device via the communication channel of the communication network. The instructions also cause the one or more processors to, responsive to the expiration of the first or second period of time, whichever comes first, initiate operation of the device in a second power management mode.

21 Claims, 11 Drawing Sheets

(56) References Cited

U.S. PATENT DOCUMENTS

| | | | |
|---|---|---|---|
| 2010/0157865 | A1 | 6/2010 | Iyer et al. |
| 7,093,141 | B2 | 8/2006 | Elnozahy et al. |
| 7,542,437 | B1 | 6/2009 | Redi et al. |
| 7,551,948 | B2 | 6/2009 | Meier et al. |
| 7,590,100 | B2 | 9/2009 | Smith et al. |
| 7,684,835 | B1 | 3/2010 | Vu et al. |
| 7,826,818 | B2 | 11/2010 | Gollnick et al. |
| 8,127,159 | B1 * | 2/2012 | Chhabra et al. ............. 713/320 |

OTHER PUBLICATIONS

Office Action in U.S. Appl. No. 12/177,656 dated May 25, 2011.

Notice of Allowance in U.S. Appl. No. 12/177,656 dated Oct. 18, 2011.

Office Action in U.S. Appl. No. 13/371,818 dated Oct. 3, 2012.

Notice of Allowance in U.S. Appl. No. 13/371,818 dated Feb. 7, 2013.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

van Nee et al. "The 802.11 n. MIMO-OFDM Standard for Wireless LAN and Beyond," Wireless Personal Communications, vol. 37, pp. 445-453 (Jun. 2006).

* cited by examiner

POWER MANAGEMENT IN A WIRELESS LOCAL AREA NETWORK

CROSS-REFERENCE TO RELATED APPLICATIONS

The present application is a continuation of U.S. patent application Ser. No. 13/908,302, now U.S. Pat. No. 8,738, 948, entitled "Power Management in a Wireless Local Area Network," filed on Jun. 3, 2013, which is a continuation application of U.S. application Ser. No. 13/371,818, now U.S. Pat. No. 8,458,502, entitled "POWER MANAGEMENT IN A WIRELESS LOCAL AREA NETWORK," filed on Feb. 13, 2012, which is a continuation application of U.S. application Ser. No. 12/177,656, now U.S. Pat. No. 8,127,159, entitled "POWER MANAGEMENT IN A WIRELESS LOCAL AREA NETWORK," filed on Jul. 22, 2008, which claims the benefit of U.S. Provisional Application No. 60/951,350, filed on Jul. 23, 2007, entitled "HYBRID APPROACH FOR IEEE POWER SAVE." The disclosures of the above-referenced applications are hereby incorporated by reference herein in their entireties.

DESCRIPTION OF RELATED ART

Wireless Local Area Network (WLAN) technology, for example, an IEEE 802.11 protocol, uses a communication device with a wireless modem to communicate data with an access point on a fixed network, or another wireless network, that in turn is usually connected to a corporate infrastructure or the Internet. The technology may also be used in cordless telephones, product tracking applications, etc. The wireless modem may be associated with a device, such as a PC card in a laptop, or may be integral to a unit, such as a cordless telephone handset. The data transmitted may be Internet Protocol (IP) data used to support a variety of applications, from Voice over Internet Protocol (VoIP) communications to web browsing. A variety of WLAN protocols exist, including, but not limited to 802.11n with the promise of more on the horizon. In some applications, the communication device may be stationary, for example, a desktop computer may use a WLAN to simplify network wiring. However, in other applications, the ability of the communication device to roam in a coverage area may be important to the success of the communication device's application, such as inventory tracking.

Power management in such devices is used to lower the overall power consumption associated with wireless data communications, particularly to optimize battery life in portable units. Two power management mechanisms are supported at this time by the IEEE WLAN standards discussed above. The two power management mechanisms are discussed below with respect to prior art FIGS. 2 and 3.

Figure 1:
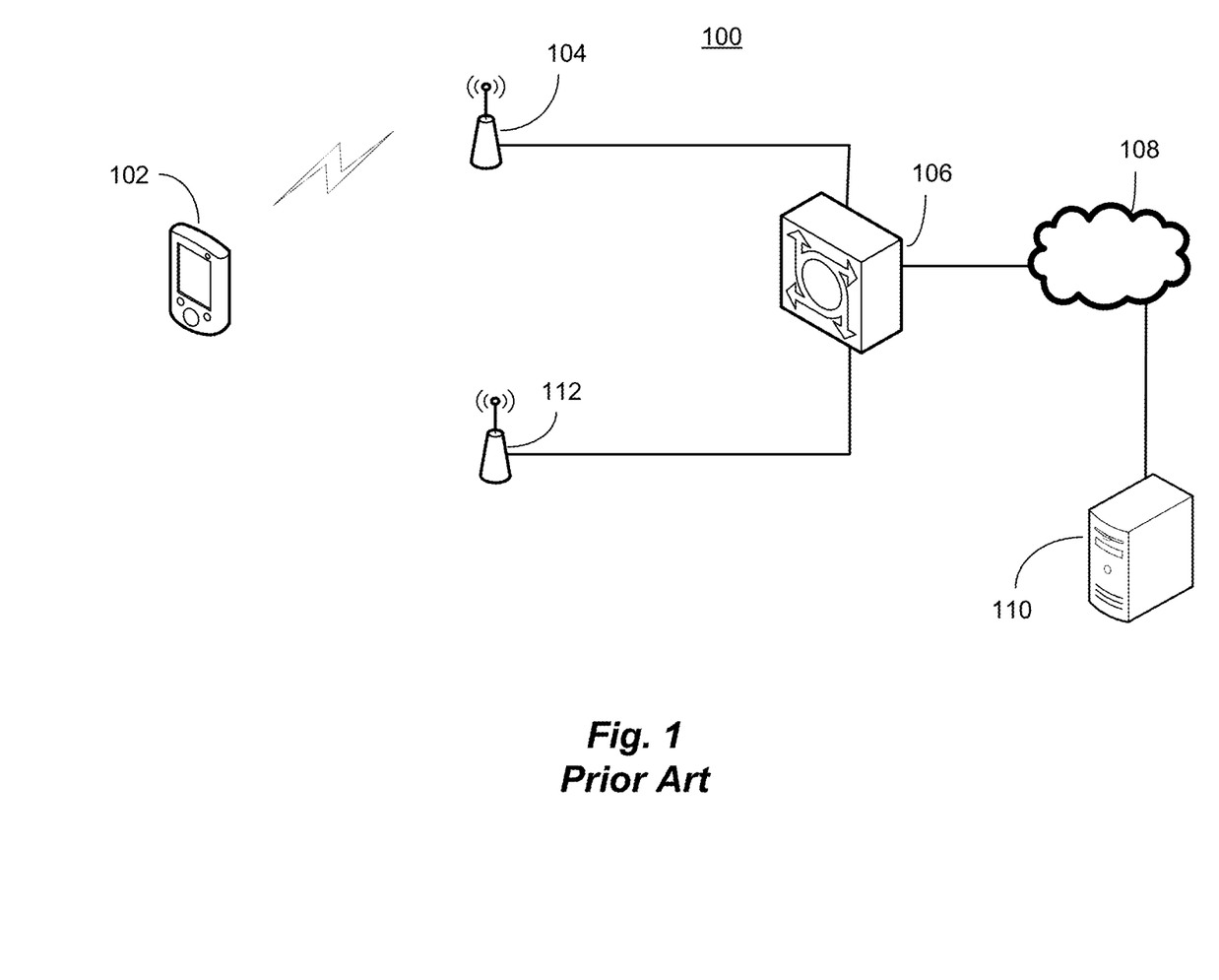
FIG. 1 is a block diagram of a prior art implementation of a wireless local area network.

FIG. 1 illustrates a typical architecture of a prior art WLAN network. The network 100 may be an 802.11-compliant network. As discussed above, there are several versions of the 802.11 standard, each version supports the two power management options described with respect to FIGS. 2 and 3 and only these two power management options. A station 102, for example, a cordless telephone handset or a laptop computer with a WLAN connection, may be connected to an access point 104. The access point 104 may be connected to a hub or controller 106 that supports connection to an enterprise or public network 108, such as the Internet. The enterprise or public network 108 may allow communication between the station 102 and a server 110. One or more additional access points 112 may allow the station 102 to roam between access points while maintaining connection with the hub or controller 106.

Figure 2:
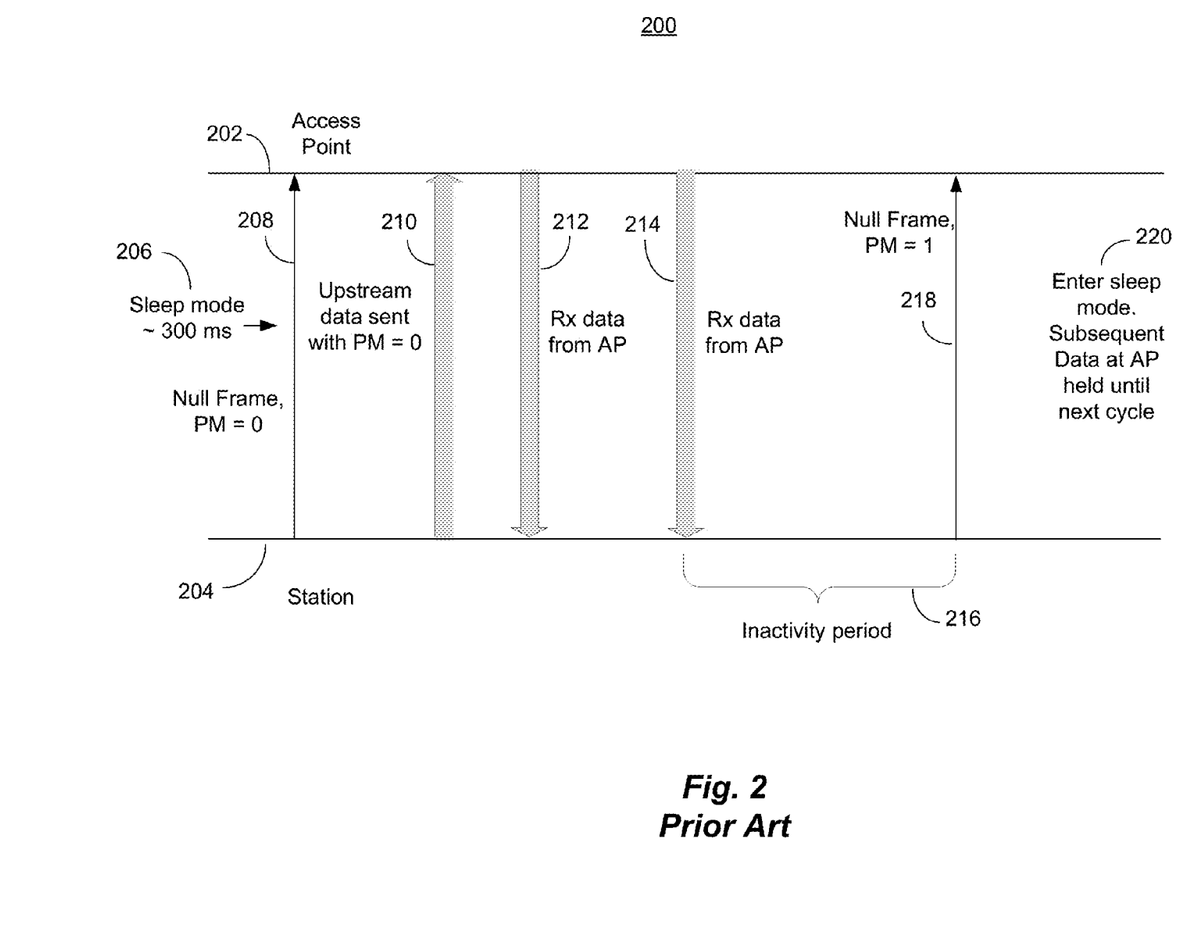
FIG. 2 is a sequence diagram illustrating a prior art power management technique.

FIG. 2 is a sequence diagram 200 illustrating one prior art power management technique. An access point 202 is represented by the upper line and a station 204 is represented by the lower line. In a known fashion, the station 204 may emerge from a sleep mode 206 and look for a beacon signal (not depicted) from the access point 202. If a beacon is present, the station 204 may send a null frame 208 with a power management bit cleared, or given a 0 value, indicating that the station 204 is not in a power management mode and is able to accept data asynchronously. If the station 204 has data to transmit to the access point 202, upstream data 210 may be sent. To indicate power management is still not being used, the power management bit in subsequent upstream messages may remain cleared. The access point 202, when it has data to send to the station 204, may send one or more messages 212, 214 to the station 204.

After each transmission from the access point 202, the station 204 may start an inactivity timer which measures an inactivity period, such as inactivity period 216. Because the access point 202 may be servicing more than one or more other stations (not depicted), an unpredictable time lapse may occur between a one transmission 212 and a subsequent transmission 214. Therefore, the inactivity period 216 may be set to a relatively long time period, such as 30 milliseconds (ms) to 50 ms. At the end of the inactivity period 216, a null frame 218 may be sent from the station 204 to the access point 202 with the power management bit set to 1, indicating that the station 204 will be entering a power management mode and cannot accept asynchronous messages from the access point 202. The station 204 may then enter a sleep mode to conserve power.

The duration of the inactivity period 216 can be problematic. If the duration is set too short, power may be conserved at the risk of missing pending messages from the access point 202. Even if missed pending messages are sent during the next cycle, in some applications, the gap in transmission may cause a perceptible delay, such as in human speech. If the duration is set too long, the station 204 may remain in an active mode well beyond a last message from the access point 202, needlessly consuming power.

Figure 3:
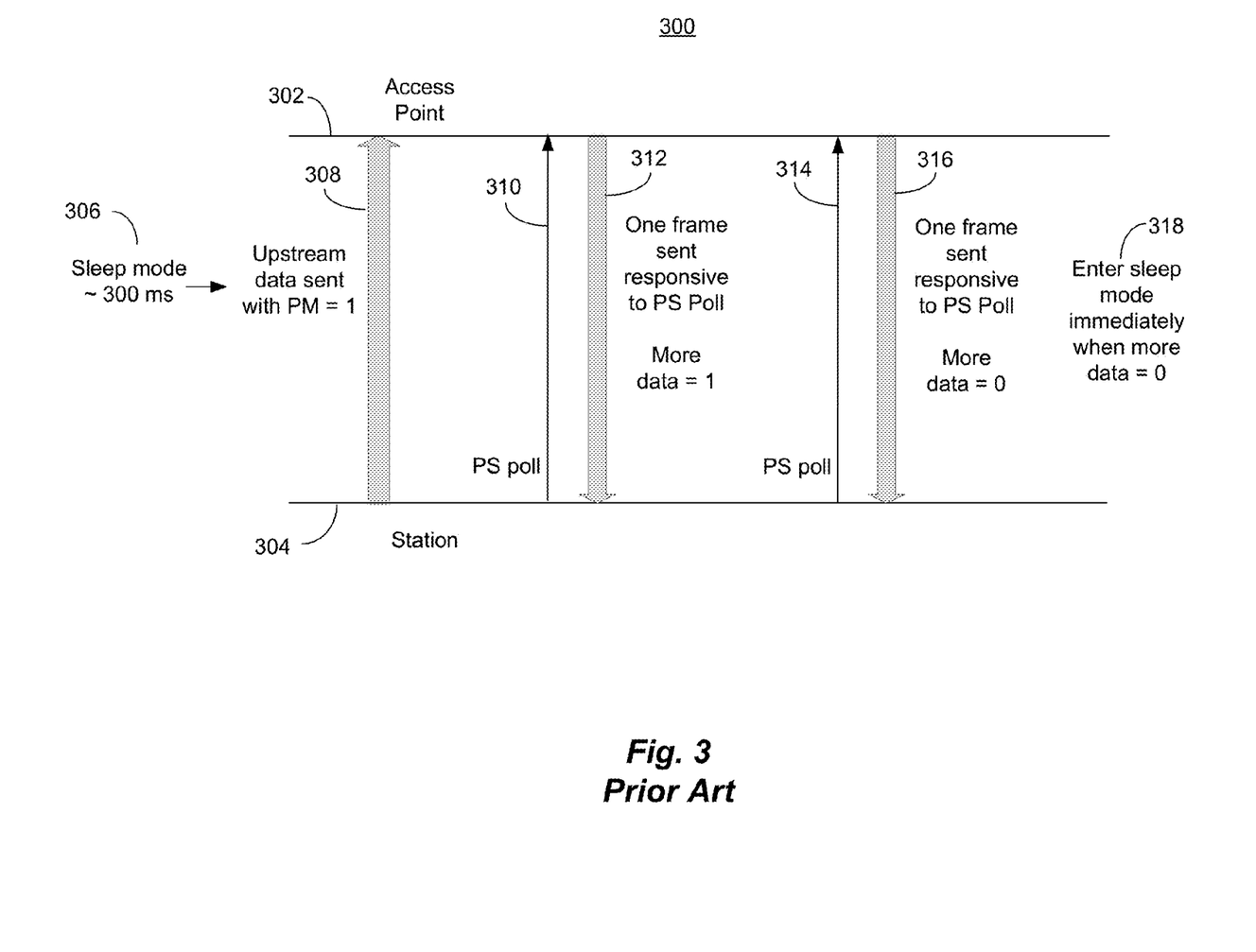
FIG. 3 is another sequence diagram illustrating another prior art power management technique.

FIG. 3 is another sequence diagram 300 illustrating a second prior art power management technique. As above, an access point 302 is represented by the upper line and a station 304 is represented by the lower line. The station 304 may emerge from a sleep mode 306. Any pending data at the station 304 may be sent in an upstream message 308 with the power management bit set to 1, indicating that the station 304 is still in a power management mode and cannot accept asynchronous messages from the access point 302. To receive data, the station 304 may send a power save poll (PS poll) message 310 to the access point 302. If data is pending for the station 304, the access point 302 may send one frame of data 312 responsive to the PS poll message 310. If more data is pending, a 'more data' bit in the frame of data 312 may be set to 1, indicating additional data is pending at the access point 302. The station 304, in response to the more data bit being set may send another PS poll message 314. The access point 302 may respond with another frame of data 316. This process may be repeated until no more data is pending for the station 304. When no more data is pending, the 'more data' bit may be cleared, for example, set to 0. The station 304, seeing that no more data is pending, may immediately enter a sleep mode after completing reception of the message 316.

This second prior art power management technique avoids a long-delay associated with an inactivity period. However, for each frame of data received from the access point 302, the station 304 must send a PS poll message. This involves not only additional steps, adding to the total time in a higher power state, but also transmitting generally requires more power than receiving, so a potential power savings achieved by avoiding an inactivity timeout period may be lost due to transmission of the PS poll messages.

SUMMARY OF THE DISCLOSURE

In one embodiment, a tangible, non-transitory computer readable storage medium or media stores machine readable instructions that, when executed by one or more processors, cause the one or more processors to, while a device in a communication network is operating in a first power management mode, simultaneously monitor for an expiration of a first period of time during which no message traffic is observed at all on a communication channel of the communication network, and an expiration of a second period of time during which no message traffic destined for the device is received by the device via the communication channel of the communication network. The instructions also cause the one or more processors to, responsive to the expiration of the first period of time or the expiration of the second period of time, whichever comes first, initiate operation of the device in a second power management mode. The second power management mode is different from the first power management mode.

In another embodiment, a tangible, non-transitory computer readable storage medium or media stores machine readable instructions that, when executed by one or more processors, cause the one or more processors to transition a device in a communication network from a first power management mode to a second power management mode, after transitioning the device from the first power management mode to the second power management mode, simultaneously monitor for an expiration of a first period of time during which no message traffic is observed at all on a communication channel of the communication network, and an expiration of a second period of time during which no message traffic destined for the device is received by the device via the communication channel of the communication network, and, responsive to the expiration of the first period of time or the expiration of the second period of time, whichever comes first, transition the device from the second power management mode to a third power management mode different than the first power management mode.

In another embodiment, a tangible, non-transitory computer readable storage medium or media stores machine readable instructions that, when executed by one or more processors, cause the one or more processors to wake a device in a communication network from a first sleep period, cause the device to send a first message indicating power management is disabled after the device wakes from the first sleep period, cause the device to send and receive data in a first power management mode after the device sends the first message, detect an expiration of a timer measuring wireless traffic inactivity, in response to detecting the expiration of the timer measuring wireless traffic inactivity, transition the device from the first power management mode to a polled power management mode, and, in response to the device receiving, while the device is in the polled power management mode, an indication that no data is pending for the device, transition the device to a second sleep period.

DETAILED DESCRIPTION

Figure 4:
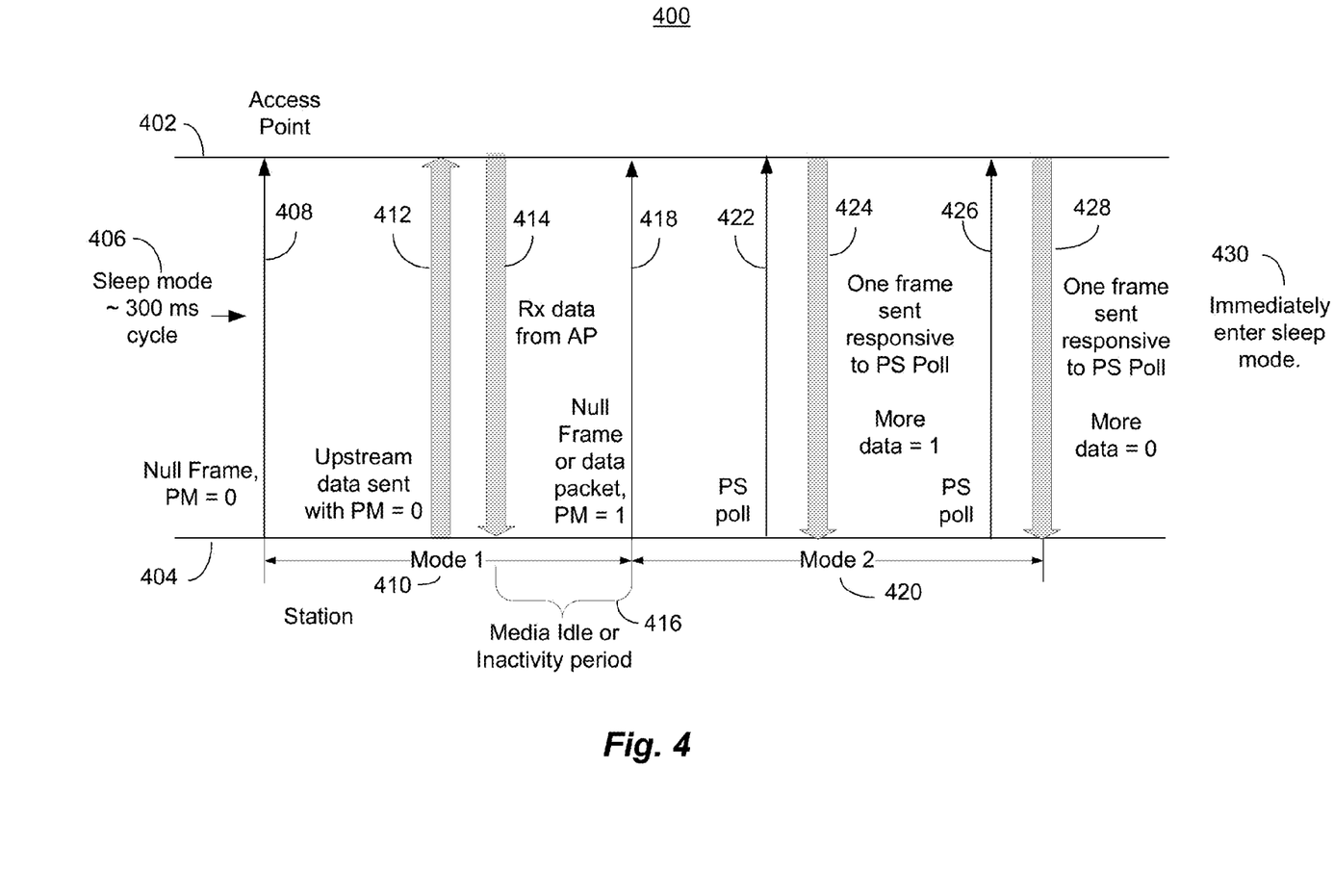
FIG. 4 is a sequence diagram illustrating a hybrid power management technique.

FIG. 4 is a sequence diagram 400 illustrating a hybrid power management technique for use in wireless local area networks (WLANs). An access point 402 is represented by an upper line and a station 404 is represented by a lower line. The station 404 may come out of a sleep mode 406 and transmit a null frame 408 with a power management bit cleared, e.g. with a value of 0. Transmission of the null frame 408 indicates to the access point 402 that the station 404 is operating in an asynchronous message mode, i.e., a first power management mode. Data at the station 404 may be transmitted to the access point 402 in an upstream message 412 with the power management bit also cleared. Downstream data may be sent in one or more messages 414 in an asynchronous fashion.

Unlike the message sequence of prior art FIG. 2, an end of an idle period 416 may be triggered by one of two events, and the end of the idle period 416 does not necessarily trigger a sleep phase. One trigger event may be the expiration of a message inactivity period, similar to the inactivity period described above. Another trigger event may be the expiration of a media idle period, explained further below.

The message inactivity period corresponds to a period of time during which no message traffic destined for the station 404 is received. In other words, even if traffic is present on a current channel, only traffic destined for the station 404 will reset a message inactivity timer and allow processing of message traffic to continue in the first power management mode 410. Even if additional messages are available for the station 404, should the access point 402 be substantially diverted by the servicing of traffic destined for other stations (not depicted in FIG. 4), expiration of the message inactivity timer will trigger an end to operation in the first power management mode 410. As opposed to the scenario described with respect FIG. 2, this does not necessarily mean that message traffic destined for the station 404 will be delayed until after the next sleep cycle.

The media idle period corresponds to a period of time during which no traffic at all is observed on the current channel. Expiration of the media idle period may indicate that the access point 402 has not been occupied by servicing traffic destined for other stations, therefore there is no pending data to be sent to the station 404.

At the end of either the media idle period or the message inactivity period, whichever comes first, a null frame 418 (or data packet if one is pending) with the power management bit set (e.g. to 1) may be sent to the access point 402. This begins operation in a second power management mode 420, for example, a polled mode similar to that described above with respect to FIG. 3. To confirm that no additional messages are pending for the station 404, the station 404 may send a power save (PS) poll message 422 to the access point 402.

If data is pending for the station 404 a frame 424 may be sent to the station 404. The frame 424, or any response to a PS poll message will typically include a "more data" bit. If the more data bit is set, for example with a value of 1, that indicates to the station 404 that additional data is pending. If the more data bit is cleared, for example with a value of 0, that indicates that no more data is pending for the station 404.

As long as more data is pending, additional PS poll messages 426 and additional responses 428 may be exchanged, until no more data is pending. However, the expiration of either the media idle period or the message inactivity period is a strong indication that no more data is pending. As shown in FIG. 4 by response 428, as soon as a response to a PS poll is received with the more data bit cleared (set to 0, for example), the station 404 may immediately enter a sleep mode 430.

While the message inactivity period may be fairly long to prevent entering a sleep mode prematurely, for example 30 ms to 60 ms, the media idle period may be much shorter, for example 300 to 600 microseconds (μs). Of course, shorter or longer message inactivity or media idle periods may also be utilized. The addition of the media idle period to the monitoring process allows the station 404 to respond much more quickly to a perceived end of message traffic. In addition, the use of a PS poll message to confirm that no more data is pending increases the confidence that entering a sleep mode will not unnecessarily delay pending traffic.

In the example implementation corresponding to FIG. 4, the access point 402 is not required to process any new message types nor is it required to handle existing message types any differently from the currently defined protocols, described above. However, by using this hybrid approach it can be seen that the lag time between receipt of a last message and entering sleep mode can be cut by as much as 40-50 ms, for example. If a typical wireless modem in active mode draws 200 milliamperes (ma), an additional 50 ms of sleep time out of a 300 ms cycle can result in a power savings of approximately 6 milliwatts per cycle, or about 16% over a typical cycle shown above in FIG. 2 for example.

Figure 5:
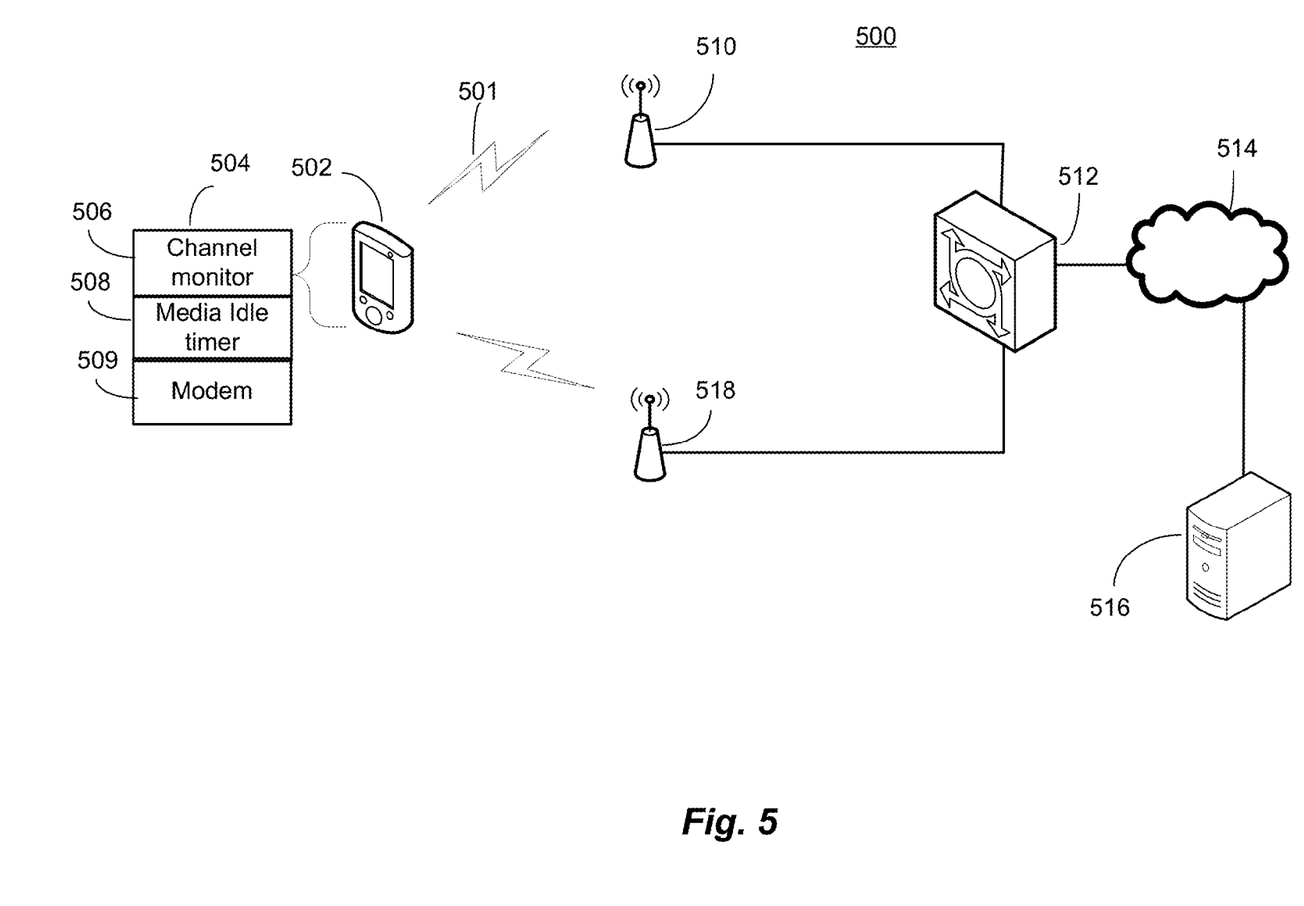
FIG. 5 is a block diagram of a wireless local area network incorporating hybrid power management in a wireless local area network.

FIG. 5 is a block diagram of an example communication network 500 incorporating a station 502 adapted for hybrid power management in a wireless local area network 501. The station 502 is shown with an additional circuit 504 incorporating a channel monitor 506 and a media idle timer 508. The station 502 may also include a modem 509, as described below with respect to FIG. 6. The station 502 may operate in a manner similar to the station 04 described with reference to FIG. 4. As described above, the station 502 may be in communication with an access point 510 or an access point 518 under the control of a router or other communications controller 512. The router or other communications controller 512 may communicate via a wide area network 514 to a server 516.

Figure 6:
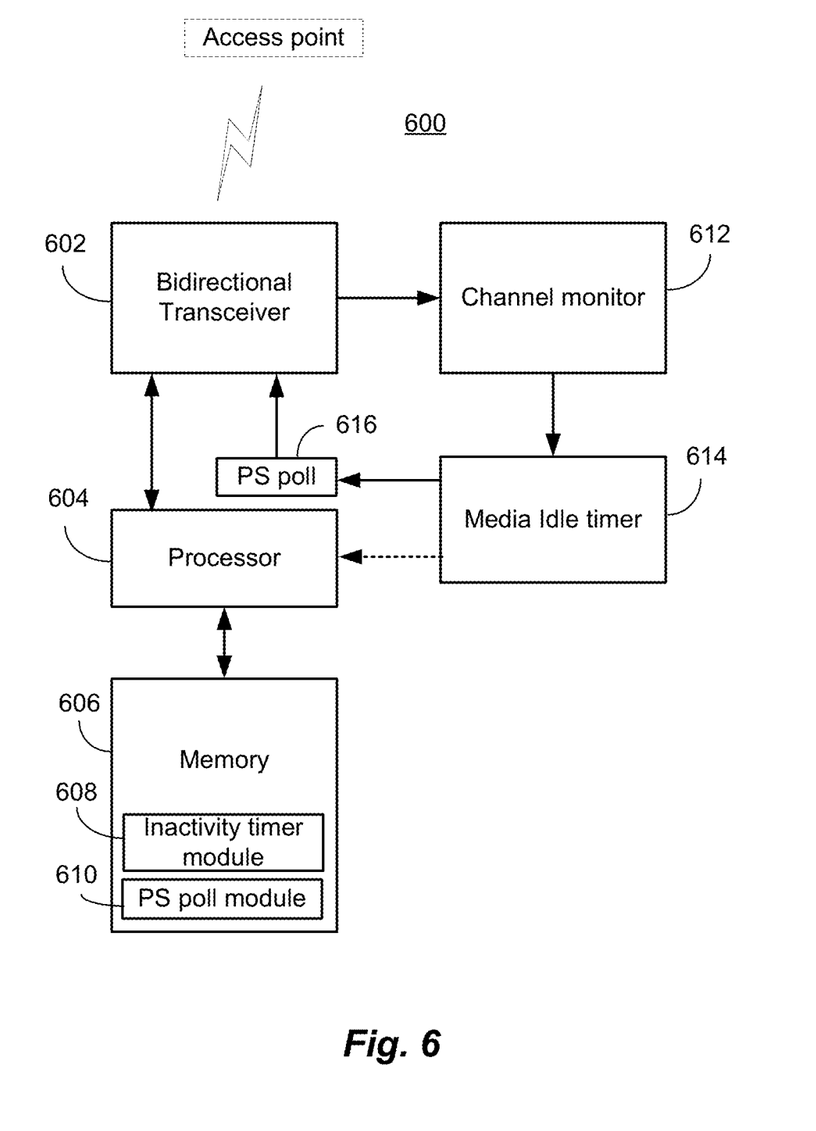
FIG. 6 is a block diagram of a wireless local area network supporting hybrid power management.

FIG. 6 is a block diagram of an example modem 600 arranged and adapted to support hybrid power management in a wireless local-area network. The modem 600 may be utilized in a station such as the station 404 or the station 502. The modem 600 may include a bidirectional transceiver 602 for use in sending and receiving over-the-air messages with an access point. The modem 600 may also include a processor 604 coupled to the bidirectional transceiver 602 and a memory 606. The memory 606 may include volatile memory, nonvolatile memory, or both and may include software modules for implementing a software inactivity timer 608 and a PS poll module 610 for preparing and sending a PS poll message.

As described above with respect to FIG. 4, a media idle period may be quite short, on the order of tens of microseconds. Because in some embodiments a software timer may not reliably service such short periods, special hardware may be used to implement media idle time monitoring. A channel monitor 612 may be coupled to the bidirectional transceiver 602 for monitoring traffic. The channel monitor 612 may provide an output to a media idle timer 614 when there is no over-the-air traffic on a channel serviced by a currently affiliated access point.

In some embodiments, expiration of the media idle timer 614 may trigger a hardware-initiated null frame 418 and PS poll message 422 to be sent via hardware poll generation module 616. At the same time, the media idle timer 614 may signal the processor 604 that the media idle period has expired and a switch between power management modes has been initiated. Other mechanisms for coupling a trigger event from the media idle timer 614 to the processor 604 to initiate a power management mode switch will be apparent to one of ordinary skill, such as triggering an interrupt in the processor 604 that may immediately call the PS poll module 610 to send the appropriate message or messages.

The processor 604 may be any of a number of general-purpose processors such as an ARM Core processor or may be a custom controller adapted particularly for support of WLAN modems. The media idle timer 614 may be similar to a simple watchdog circuit that uses a system clock as an input to a counter that starts at a preset number and counts down to 0 unless reset by an input signal, such as a signal from the channel monitor 612 indicating activity on the channel. Other counter/timer embodiments are known to those of ordinary skill in the art. The media idle timer 614 may have a fixed expiration period or may be settable via jumpers or programmable via command from the processor 604.

Figure 7:
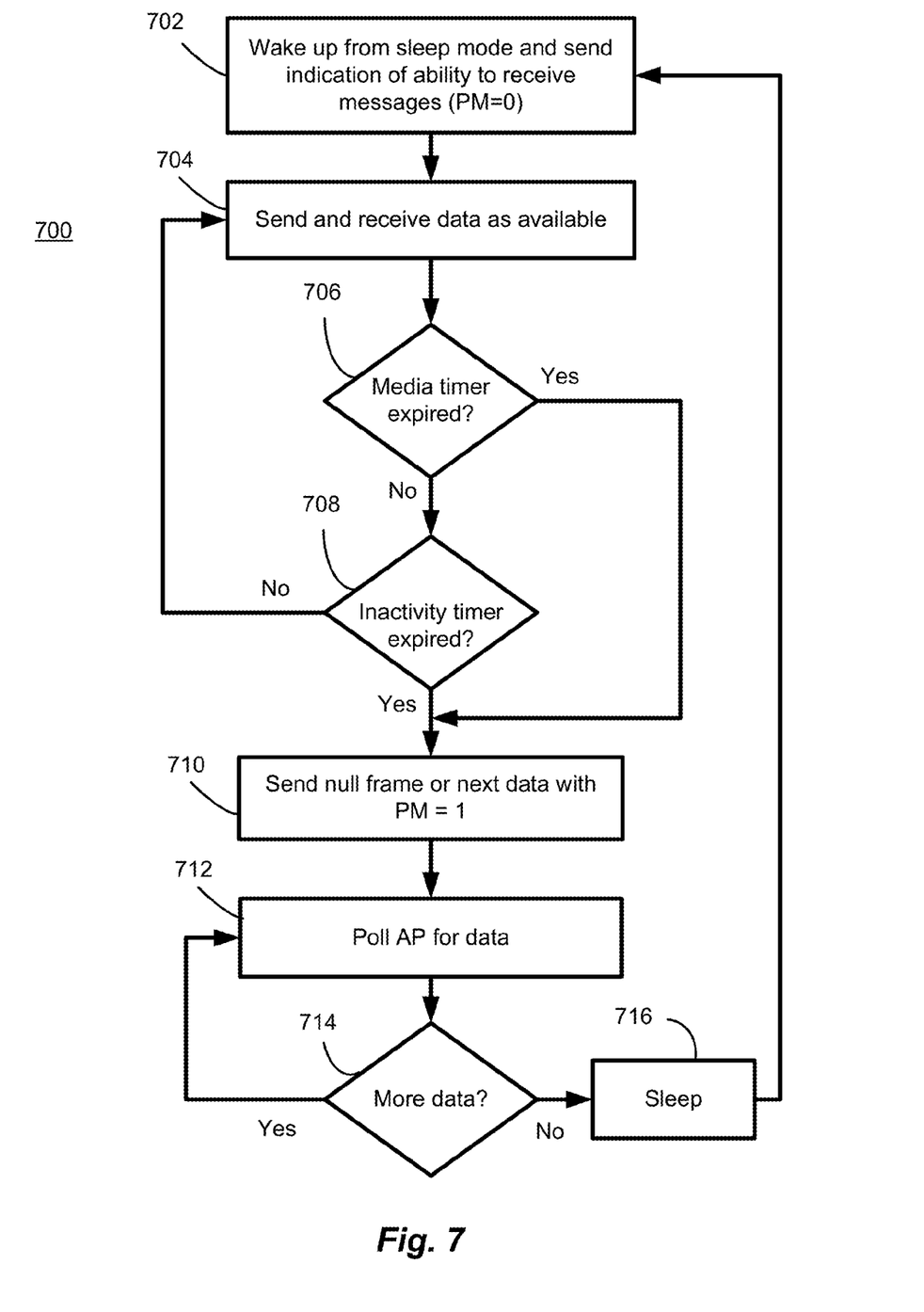
FIG. 7 is a method of performing hybrid power management in a wireless local area network.

FIG. 7 is a flow diagram of an example method 700 of performing hybrid power management in a wireless local area network (WLAN) as implemented in a WLAN modem. The method 700 may be implemented by a modem such as the modem 600 of FIG. 6. For ease of explanation, the method 700 will be described with reference to FIG. 6. It will be understood, however, that the method 700 can be implemented by other modems as well.

At block 702, the modem 600, may wake up from a sleep mode. Waking from the sleep mode may be timed to match a beacon signal from an access point, e.g. access point 510 of FIG. 5, and in some embodiments the beacon wake up period may be set to approximately 300 milliseconds (ms), but may fall in a range from 290 milliseconds to 310 milliseconds. More generally, the time period may be set depending on the particular implementation. Upon waking from the sleep mode, the modem 600 may send a message, such as a status transmit packet, to the access point 510, indicating that it is awake and operating in a fully active mode. In some embodiments, particularly any of the versions of the 802.11 WLAN standard, this is accomplished by clearing a "power management" bit in the message sent to the access point 510.

At block 704, the modem 600 may exchange information with the access point 510. While messages are being received from the access point 510 more or less continuously, neither of the associated timers will reach expiration.

At block 706, a media idle timer 614 may be checked for expiration. If the media idle timer 614 has not expired, execution may follow the 'no' branch to block 708.

At block 708, an inactivity timer 608 may be checked for expiration. If the inactivity timer 608 has not expired, the 'no' branch from block 708 may be taken to block 704 and operation of the modem may be maintained in the asynchronous reception mode (first power management mode).

Returning to block 706, if the media timer has expired the 'yes' branch from block 706 may be taken to block 710. Alternatively, the media idle timer 614 may trigger an interrupt that causes execution to continue at block 710, thus avoiding potential loop timing issues that may occur in the embodiment shown in FIG. 7.

Similarly, if the inactivity timer 608 has expired at block 708, execution may follow the 'yes' branch to block 710. At block 710, a null frame may be sent to the access point 510 with the power management bit set. This informs the access point 510 that the modem 600 is no longer available to accept messages asynchronously, and pending messages will be queued at the access point 510. If the modem 600 has data waiting to be sent to the access point 510, rather than sending a null frame, a data packet may be sent with the power management bit set.

At block 712, the modem 600 begins operation in a polling power management mode. A poll request packet may be sent by the modem 600 to the access point 510 requesting data if available.

At block 714, a response message from the access point 510, may be examined to determine if the response message contains an indication that more data is pending for the modem 600. If more data is available the 'yes' branch from block 714 may be taken back to block 712 and an additional polling message sent to the access point 510. If, at block 714 the response message contains an indication that no more data is pending, the 'no' branch from block 714 may be taken to block 716.

At block 716, since no additional data is pending for a modem 600, the modem 600 may immediately enter a sleep mode until waking up for the next beacon signal and starting the cycle at block 702.

FIGS. 8A-8F, illustrate various devices in which a hybrid power management techniques such as described above may be employed.

Figure 8A:
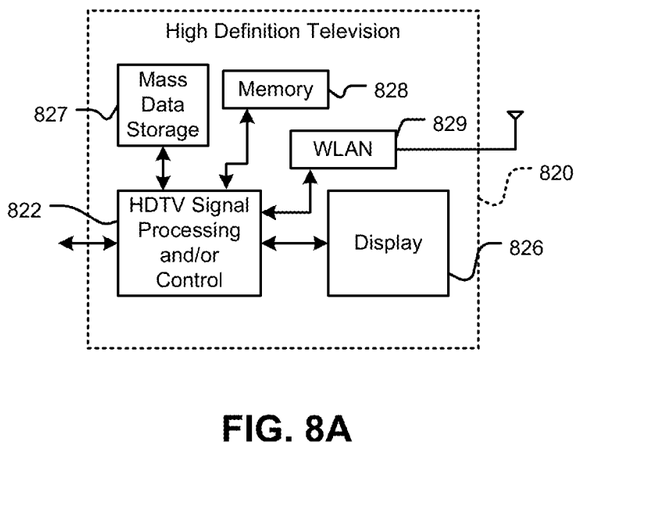
FIGS. 8A-8F illustrate exemplary embodiments incorporating hybrid power management for wireless local area networks.

Referring now to FIG. 8A, such techniques may be utilized in a high definition television (HDTV) 820, particularly a mobile HDTV used portably in a home, resort, sports venue, etc. HDTV 820 includes a mass data storage 827, an HDTV signal processing and control block 822, a WLAN interface 829 and memory 828. HDTV 820 receives HDTV input signals in either a wired or wireless format and generates HDTV output signals for a display 826. In some implementations, signal processing circuit and/or control circuit 822 and/or other circuits (not shown) of HDTV 820 may process data, perform coding and/or encryption, perform calculations, format data and/or perform any other type of HDTV processing that may be required.

The WLAN interface 829 may implement hybrid power management as discussed and described above. HDTV 820 may be connected to memory 828 such as RAM, ROM, low latency nonvolatile memory such as flash memory and/or other suitable electronic data storage.

Figure 8B:
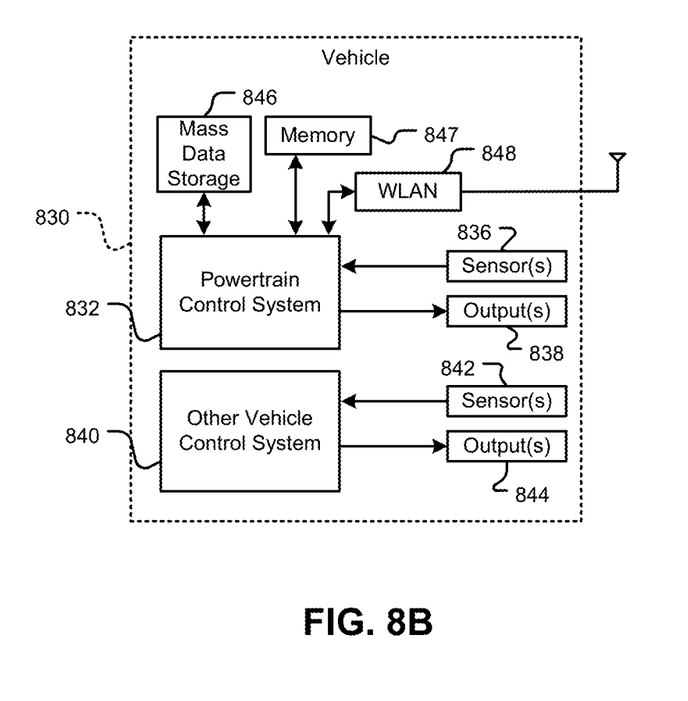

Referring now to FIG. 8B, such techniques may be utilized in a vehicle 830. The vehicle 830 includes a control system that may include mass data storage 846, as well as a WLAN interface 848. A powertrain control system 832 may receive inputs from one or more sensors 836 such as temperature sensors, pressure sensors, rotational sensors, airflow sensors and/or any other suitable sensors and generate one or more output control signals 838 such as engine operating parameters, transmission operating parameters, and/or other control signals.

Control system 840 may likewise receive signals from input sensors 842 and/or output control signals to one or more output devices 844. In some implementations, control system 840 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 832 may communicate with mass data storage 827 that stores data in a nonvolatile manner such as optical and/or magnetic storage devices. Powertrain control system 832 may be connected to memory 847 such as RAM, ROM, low latency nonvolatile memory such as flash memory and/or other suitable electronic data storage. Powertrain control system 832 also may support connections with a WLAN (not depicted) via a WLAN network interface 848. The WLAN network interface may be used when the vehicle is within access of one or more network access points (not depicted). The WLAN network interface may use hybrid power management as described above.

Figure 8C:
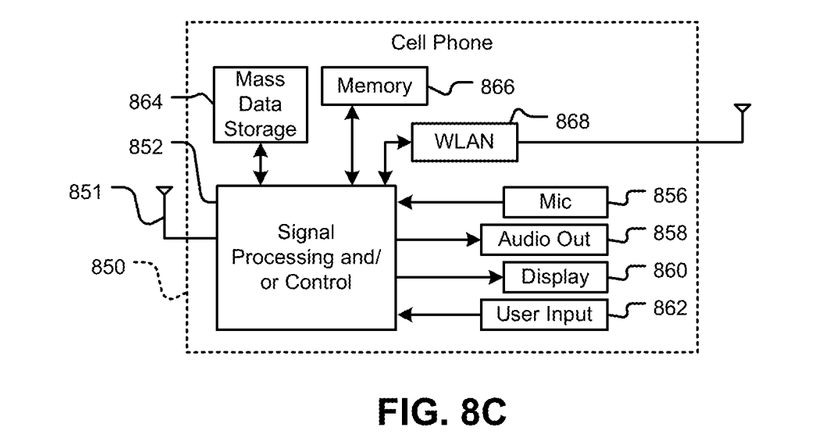

Referring now to FIG. 8C, a cellular phone 850 may include a cellular antenna 851, signal processing and/or control circuits, which are generally identified in FIG. 8C at 852, a WLAN interface 868 and/or mass data storage 864 of the cellular phone 850. In some implementations, cellular phone 850 includes a microphone 856, an audio output 858 such as a speaker and/or audio output jack, a display 860 and/or an input device 862 such as a keypad, pointing device, voice actuation and/or other input device. Signal processing and/or control circuits 852 and/or other circuits (not shown) in cellular phone 850 may process data, perform coding and/or encryption, perform calculations, format data and/or perform other cellular phone functions.

Cellular phone 850 may communicate with mass data storage 864 that stores data in a nonvolatile manner such as optical and/or magnetic storage devices for example hard disk drives HDD and/or DVDs. Cellular phone 850 may be connected to memory 866 such as RAM, ROM, low latency nonvolatile memory such as flash memory and/or other suitable electronic data storage. Cellular phone 850 also may support data connections via a WLAN network interface 868. The WLAN network interface 868 may be preferred when available for carrying voice or data traffic as being a lower cost system than a wide-area cellular network. The WLAN network interface 868 may use a hybrid power management technique, as described above.

Figure 8D:
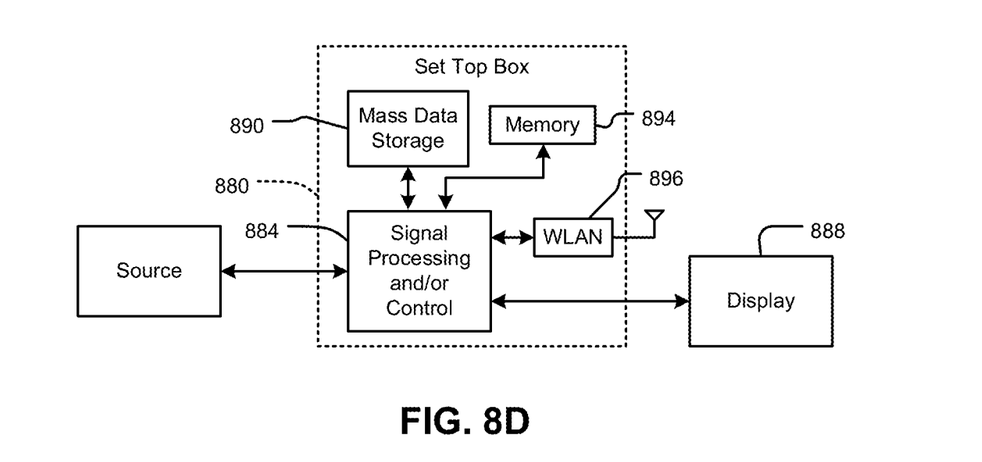

Referring now to FIG. 8D, a set top box 880 may include either or both signal processing and/or control circuits, which are generally identified in FIG. 8D at 884, a WLAN interface 896 and/or mass data storage 890 of the set top box 880. Set top box 880 receives signals from a source such as a broadband source and outputs standard and/or high definition audio/video signals suitable for a display 888 such as a television and/or monitor and/or other video and/or audio output devices. Signal processing and/or control circuits 884 and/or other circuits (not shown) of the set top box 880 may process data, perform coding and/or encryption, perform calculations, format data and/or perform any other set top box function.

Set top box 880 may communicate with mass data storage 890 that stores data in a nonvolatile manner. Mass data storage 890 may include optical and/or magnetic storage devices for example hard disk drives HDD and/or DVDs. Set top box 880 may be connected to memory 894 such as RAM, ROM, low latency nonvolatile memory such as flash memory and/or other suitable electronic data storage. Set top box 880 also may support connections with a WLAN via a WLAN network interface 896. The WLAN network interface may incorporate a hybrid power management technique such as described above.

Figure 8E:
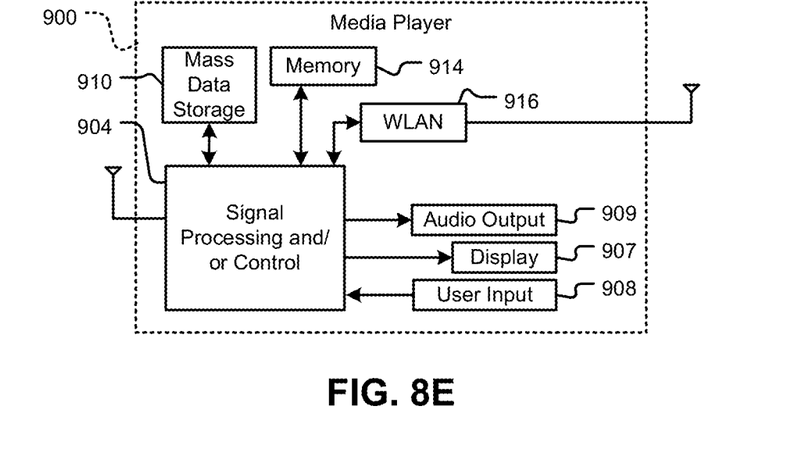

Referring now to FIG. 8E, a media player 900 may include either or both signal processing and/or control circuits, which are generally identified in FIG. 8E at 904, a WLAN interface 916 and/or mass data storage 910 of the media player 900. In some implementations, media player 900 includes a display 907 and/or a user input 908 such as a keypad, touchpad and the like. In some implementations, media player 900 may employ a graphical user interface (GUI) that typically employs menus, drop down menus, icons and/or a point-and-click interface via display 907 and/or user input 908. Media player 900 further includes an audio output 909 such as a speaker and/or audio output jack. Signal processing and/or control circuits 904 and/or other circuits (not shown) of media player 900 may process data, perform coding and/or encryption, perform calculations, format data and/or perform any other media player function.

Media player 900 may communicate with mass data storage 910 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. Media player 900 may be connected to memory 914 such as RAM, ROM, low latency nonvolatile memory such as flash memory and/or other suitable electronic data storage. Media player 900 also may support connections with a WLAN via a WLAN network interface 916. Communication via the WLAN network interface 916 may be used to support real-time updates, downloading content, streaming of media content, etc. The WLAN network interface 916 may use hybrid power management techniques, as described above.

Figure 8F:
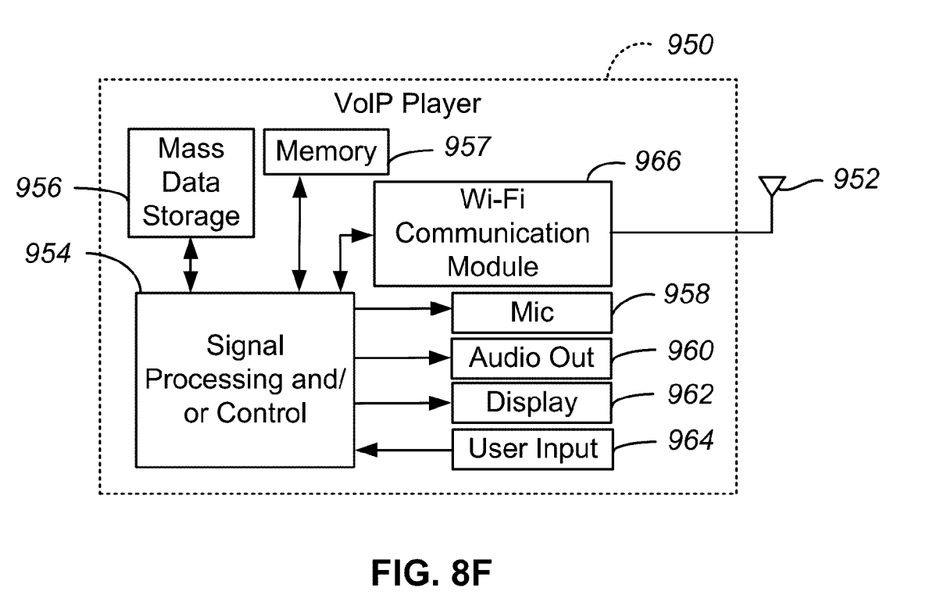

Referring to FIG. 8F, such techniques may be utilized in a Voice over Internet Protocol (VoIP) phone 950 that may include an antenna 952. The VoIP phone 950 may include either or both signal processing and/or control circuits, which are generally identified in FIG. 8F at 954, a wireless interface and/or mass data storage of the VoIP phone 950. In some implementations, VoIP phone 950 includes, in part, a microphone 958, an audio output 960 such as a speaker and/or audio output jack, a display monitor 962, an input device 964 such as a keypad, pointing device, voice actuation and/or other input devices, and a Wireless Fidelity (WiFi) communication module 966, also known as a WLAN interface. The WiFi/WLAN communication module 966 may incorporate a hybrid power management technique, as described above. Signal processing and/or control circuits 954 and/or other circuits (not shown) in VoIP phone 950 may process data, perform coding and/or encryption, perform calculations, format data and/or perform other VoIP phone functions.

VoIP phone 950 may communicate with mass data storage 956 that stores data in a nonvolatile manner such as optical and/or magnetic storage devices, for example hard disk drives HDD and/or DVDs. VoIP phone 950 may be connected to memory 957, which may be a RAM, ROM, low latency nonvolatile memory such as flash memory and/or other suitable electronic data storage. VoIP phone 950 is configured to establish communications link with a VoIP network (not shown) via Wi-Fi communication module 966.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

We claim:
1. A method, comprising:
   transmitting, with a communication device, a first frame having a power management mode indicator set to indicate that the communication device is not operating in a polling mode;
   after transmitting the first frame,
      monitoring, at the communication device, a first timer,
      monitoring, at the communication device, a second timer,
      determining, at the communication device, whether a received frame is for the communication device, and
      responsive to the received frame,
         resetting, at the communication device, the first timer, and resetting, at the communication device, the second timer only if it is determined that the received frame is for the communication device;

responsive to an earlier of i) expiration of the first timer, or ii) expiration of the second timer, transmitting, with the communication device, a second frame having the power management mode indicator set to indicate the communication device is operating in the polling mode;

after transmitting the second frame, transmitting, with the communication device, a poll frame;

receiving, at the communication device, a response to the poll frame that includes information indicating whether more data is available to be sent to the communication device;

when the response indicates that more data is available to be sent to the communication device, transmitting, with the communication device, another poll frame; and when the response indicates that no more data is available to be sent to the communication device, causing the communication device to enter a reduced power mode.

2. The method of claim 1, wherein transmitting the first frame is responsive to the communication device exiting the reduced power mode.

3. The method of claim 1, wherein the first timer corresponds to measuring a length of inactivity on a communication medium.

4. The method of claim 1, wherein the first timer is reset to correspond to a time in a range of 300 to 600 microseconds.

5. The method of claim 4, wherein the second timer is reset to correspond to a time in a range of 40 to 60 milliseconds.

6. The method of claim 1, wherein the first timer is implemented as a hardware timer of the communication device.

7. The method of claim 1, wherein the poll frame is a power save (PS) poll frame.

8. The method of claim 1, wherein the second timer is implemented using a processor of the communication device, the processor executing software instructions.

9. An apparatus, comprising:
a modem having one or more integrated circuits configured to
transmit a first frame having a power management mode indicator set to indicate that the modem is not operating in a polling mode,
after transmitting the first frame,
monitor a first timer,
monitor a second timer,
determine whether a received frame is for a communication device that includes the modem, and
responsive to the received frame,
reset the first timer, and
reset the second timer only if it is determined that the received frame is for the communication device,
responsive to an earlier of i) expiration of the first timer, or ii) expiration of the second timer, transmit a second frame having the power management mode indicator set to indicate the communication device is operating in the polling mode,
after transmitting the second frame, transmit a poll frame,
receive a response to the poll frame that includes information indicating whether more data is available to be sent to the communication device,
when the response indicates that more data is available to be sent to the communication device, transmit another poll frame, and
when the response indicates that no more data is available to be sent to the communication device, cause the modem to enter a reduced power mode.

10. The apparatus of claim 9, wherein transmitting the first frame is responsive to the modem exiting the reduced power mode.

11. The apparatus of claim 9, wherein the first timer corresponds to measuring a length of inactivity on a communication medium.

12. The apparatus of claim 9, wherein the first timer is reset to correspond to a time in a range of 300 to 600 microseconds.

13. The apparatus of claim 12, wherein the second timer is reset to correspond to a time in a range of 40 to 60 milliseconds.

14. The apparatus of claim 9, wherein the one or more integrated circuits comprise the first timer implemented as a hardware timer.

15. The apparatus of claim 14, wherein the one or more integrated circuits comprise:
a processor; and
a memory coupled to the processor, the memory storing instructions that, when executed by the processor, cause the processor to implement the second timer.

16. The apparatus of claim 15, wherein the memory further stores instructions that, when executed by the processor, cause the processor to
monitor the first timer,
monitor the second timer,
responsive to the received frame,
reset the first timer, and
reset the second timer only if it is determined that the received frame is for the communication device, and
cause the modem to enter the reduced power mode when the response indicates that no more data is available to be sent to the communication device.

17. A tangible, non-transitory computer readable medium, or media, storing machine readable instructions that, when executed by a processor, cause the processor to:
after a communication device transmits a first frame having a power management mode indicator set to indicate that the communication device is not operating in a polling mode,
a monitor a first timer of the communication device, and
monitor a second timer of the communication device;
responsive to a frame received by the communication device,
reset the first timer, and
reset the second timer only if it is determined that the received frame is for the communication device;
responsive to an earlier of i) expiration of the first timer, or ii) expiration of the second timer, cause the communication device to transmit a second frame having the power management mode indicator set to indicate the communication device is operating in the polling mode;
after transmitting the second frame, cause the communication device to transmit a poll frame;
when a received response to the poll frame indicates that more data is available to be sent to the communication device, transmit another poll frame; and
when the received response to the poll frame indicates that no more data is available to be sent to the communication device, cause the communication device to enter a reduced power mode.

18. The computer readable medium, or media, of claim 17, further storing machine readable instructions that, when executed by a processor, cause the processor to cause the communication device to transmit the first frame responsive to the communication device exiting the reduced power mode.

19. The computer readable medium, or media, of claim 17, wherein the first timer corresponds to measuring a length of inactivity on a communication medium.

20. The computer readable medium, or media, of claim 17, further storing machine readable instructions that, when executed by a processor, cause the processor to reset the first timer to correspond to a time in a range of 300 to 600 microseconds.

21. The apparatus of claim 20, further storing machine readable instructions that, when executed by a processor, cause the processor to reset the second timer to correspond to a time in a range of 40 to 60 milliseconds.

* * * * *